United States Patent [19]

Erickson et al.

[11] 3,875,901

[45] Apr. 8, 1975

[54] VENTILATED SHELTER STRUCTURE FOR CATTLE CONFINEMENT FEEDLOT

[76] Inventors: Lennart G. Erickson, 1070 East Meadows, San Mateo, Calif. 94303; William S. Erickson, 2075 Pioneer Ct., Los Gatos, Calif. 94402

[22] Filed: Jan. 10, 1974

[21] Appl. No.: 432,362

[52] U.S. Cl. .......................... 119/16; 119/28; 98/42
[51] Int. Cl. ........................ A01k 1/00; F24f 7/02
[58] Field of Search ............. 119/16, 21, 28; 98/42, 98/42.1, 19, 13; 52/199, 198

[56] References Cited
UNITED STATES PATENTS 1,408,432  3/1922  Arnold .......................... 98/42 X
1,926,160  9/1933  McKee .......................... 52/199

*Primary Examiner*—Hugh R. Chamblee
*Attorney, Agent, or Firm*—Townsend and Townsend

[57] ABSTRACT

An improved structure for shelter of cattle in close confinement feedlot areas. The structure has a roof formed from a plurality of metal panels arranged with edges overlapping in a horizontal plane and vertically separated to form ventilating slots which allow diffused free airflow therethrough.

9 Claims, 3 Drawing Figures

PATENTED APR 8 1975 3,875,901
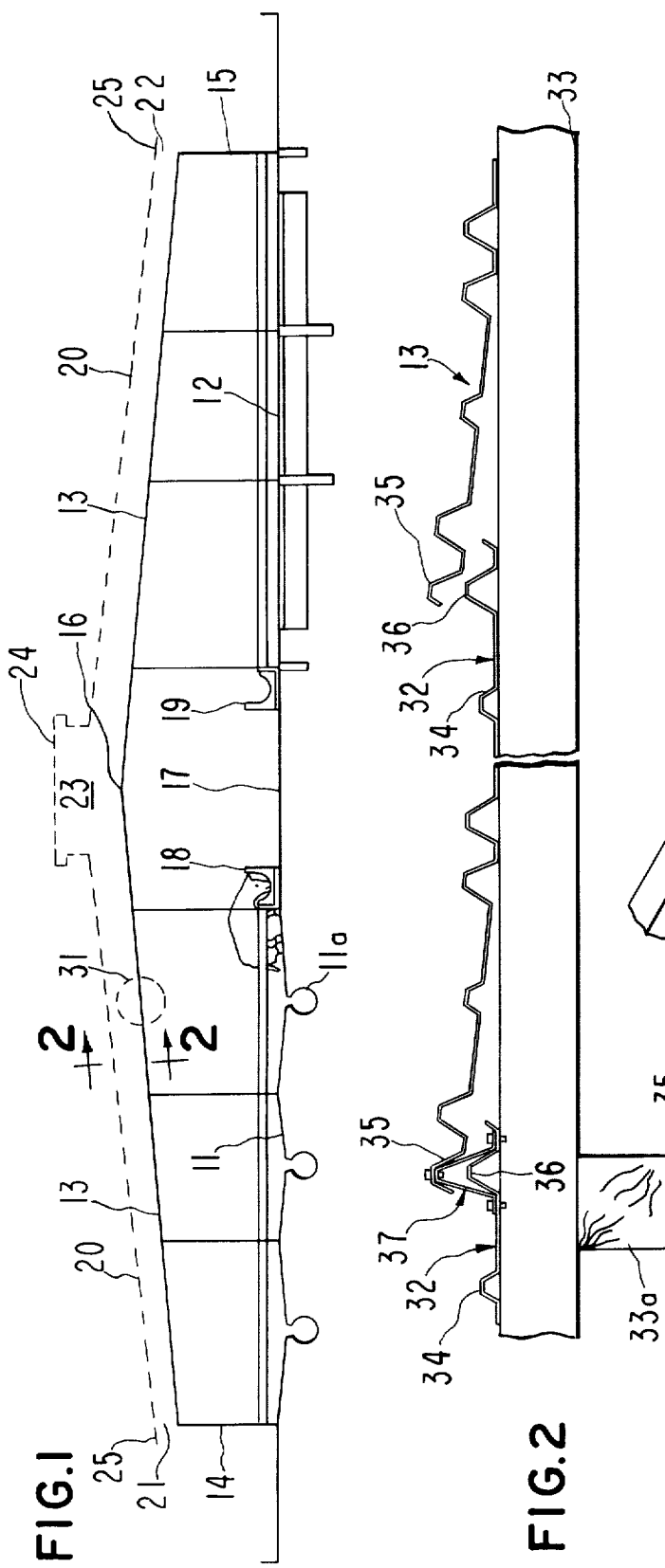
FIG.1
FIG.2
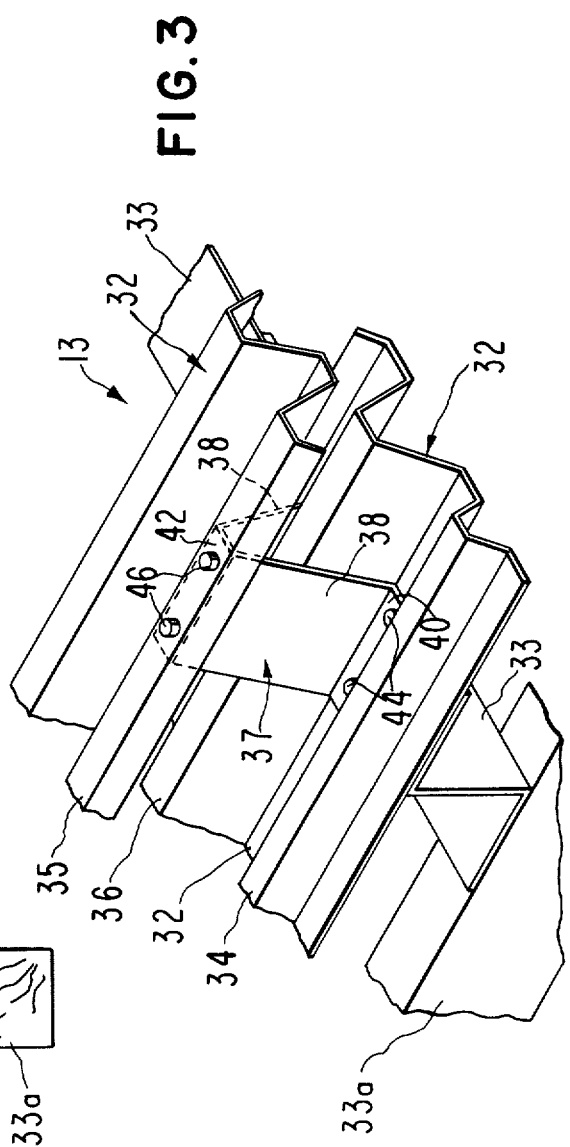
FIG.3

VENTILATED SHELTER STRUCTURE FOR CATTLE CONFINEMENT FEEDLOT

BACKGROUND OF THE INVENTION

1. Field of the Invention

This invention relates to an improved shelter structure and is especially applicable to the close confinement and penfeeding of farm animals.

2. Description of the Prior Art

The February 1971 Staff Report of the National Industrial Pollution Control Council (U.S. Government Printing Office 1971-431-795/200) on the subject of "Animal Wastes" summarizes the growing problem of pollution of water, soil and air resources created by the waste products of farm animals. A major source of environmental pollution is the excreted waste products of farm animals in feedlots, particularly beef cattle. More specific information has been published in "The Mounting Problem of Cattle Feedlot Pollution," Agricultural Science Review, U.S. Department of Agriculture, Volume 9, No. 1, 1st Quarter 1971.

In recent years, enclosed or semi-enclosed confinement feedlot building structures are increasingly used to shelter the cattle from the elements in a more sanitary environment. Liquid slurry manure wastes are removed through floor slots discharging into subfloor collection storage pits or removal channels. Individual pens hold 20 to 150 cattle at an average density of about one animal per 20 square feet of floor space.

Many such confinement feedlot facilities have been described in the literature, for instance: "Progress Report on Confinement Feeding Research," a June 1972 publication of Iowa Beef Processors, Inc., Dakota City, Nebr. Leading manufacturer contractors who are specialists in the design and construction of similar confinement feeding facilities are Corral Industries, Inc., Phoenix, Ariz. Dabco, Inc., La Salle, Co.; Butler Manufacturing Company, Kansas City, Mo.; and Badger Northland Inc., Kaukauna, Wis.

An improved floor structure for such confinement feedlot buildings is described in U.S. patent application SANITARY FLUSHIBLE FLOOR FOR CATTLE CONFINEMENT FEEDLOTS, Ser. No. 385,621, filed Aug. 3, 1973, in the name of Ralph Kissinger, Jr. An improved method for inhibiting bacterial decomposition during the process of accumulation and removal of liquid manure from such confinement feedlot buildings is described in a U.S. patent application of Lennary G. Erickson and William Scott Erickson, entitled, APPARATUS AND METHOD FOR HANDLING ANIMAL WASTES, Ser. No. 290,016, Filed Sept. 18, 1972.

Provision for adequate ventilation is a problem in structures for housing of cattle in close confinement. It is important to animal health and comfort that adequate ventilation be provided to prevent buildup of air temperature, humidity and noxious odors and gases incident to decomposition of animal wastes.

Under average ambient conditions a 1,000 pound animal releases to the environment about 3,000 btu per hour of body heat, about 1.75 gallons per day of water vapor from respiration and body evaporation, and a daily excretion of about 9 gallons of liquid manure slurry. Additional interior air humidity is created through evaporation of water used in flush cleaning operations and from watering troughs.

Most confinement feedlot structures heretofore used or described, and which effectively shelter the animals from sun, rain, snow and strong winds, employ a sloped or peaked roof construction in which practially all of the roof surface is solid material impervious to airflow. At the roof ridgeline of highest elevation, ventilation openings are provided for exhaust of the warm, humid air rising from the animal floor and flowing upward along the inside rising slope of the peaked roof structure. Usually such ridgeline ventilators comprise an open slot running full length of the building. For adequate discharge this slot should be about 4 percent of the area of the animal floor below. For a "double-wide" building, about 110 feet in width, and with cattle pens on each side of a centerline feed-truck alley, this ridgeline open slot should be about 4 feet in effective width.

To provide protection from undesirable entry of rain, sleet, and snow, the ventilation slot is often covered by a canopy superstructure arranged for substantial overhang or with louvered slots. Sometimes wind venturi-action ventilators or motor-powered exhaust blowers are used.

To provide increased ventilation in such conventional structures, relatively high, open sidewalls are used primarily to increase the flow of incoming air. The resultant increased exposure of the cattle to sun, wind and rain is undesirable. For protection of the animals during particularly adverse weather, sidewall doors, panels, louvers or canopies are often used.

A peaked roof slope of 8½ percent or less is usually adequate for roof structure and drainage requirements, however, this slope may be increased up to about 25% to secure some increase in thermal heat rise flow of air toward the ridgeline ventilators.

The resulting combination of increased sidewall height plus increased roofpeak structure height, plus increased open sidewall area, plus auxiliary canopy construction all result in a corresponding susceptibility to wind storm damage. This must be compensated for by increasing the strength and weight of building structural members.

When exterior air temperature is low relative to the warm and humid interior airflow in contact with the cold roof panel surface, troublesome condensation of water upon such surfaces will result. Thermal insulation or special drainage construction is often required for resolution of this problem. The special construction features outlined above often add up to a substantial proportion of initial construction costs and subsequent maintenance. Apparently for these and other reasons most feedlots construction in recent years have been of the conventional open lot type although it is well-known that such feedlots are less efficient in beef production and have a much greater potential for environmental pollution from odors, runoff during rain periods and seepage pollution of subsurface waters.

SUMMARY OF THE INVENTION AND OBJECTS

The present invention is directed to a building for housing farm animals in close confinement with each other wherein the building has an improved roof provided with ventilation slots to allow the venting of warm, humid air from within the building to provide comfort for the animals housed therein. The roof is peaked and formed of a plurality of interconnected panels which slope downwardly from the roofpeak. The proximal side margins of each pair of adjacent roof panels are in proximity to each other but are spaced apart by spaced projections to form the slots therebetween. Each panel is provided with hollow reinforcing ribs which extend longitudinally of the adjacent slot and direct rain water toward the corresponding eave region. The configurations of the side margins of the panels near adjacent slots form serpentine paths for the air passing through the slots, such paths serving to prevent the entrance of rain, sleet or snow into the building through the slots.

Functional improvements achieved include:

1. effective diffused ventilation of total area below the roof;

2. effective equalization of air temperature near interior surfaces or roof panels, practically eliminating moisture condensation thereon; and 3. effective equalization of potentially destructive interior/exterior air pressure differentials during windstorm conditions.

Structural improvements and related costs savings thus made possible include:

4. reduced height of open sidewall ventilation areas;

5. reduced height of roofpeak structure;

6. elimination of usual requirements for a roofpeak vent discharge slot; and 7. elimination of the canopy shelter structure usually required to control entry of wind, rain, sleet and snow through such vent discharge slots. These improved structural factors result in substantial reductions in cubic volume of building structure and in building surface areas exposed to potential damage during windstorm conditions.

A priority objective of the present invention is to provide a functionally suitable shelter structure for close confinement feeding of farm animals, wherein the structure is substantially less costly than any previously known construction of equal functional utility.

An object of this invention is to provide an animal shelter structure with improved diffused airflow ventilation accomplished by the use of multiple slots throughout the roof surface area of the structure.

An object of this invention is to provide a structure of the type described having a slotted roof surface for air diffusion equalization of temperature of air immediately adjacent to interior roof surface to reduce moisture condensation therewith.

An object of this invention is the provision of a slotted roof surface for the aforesaid structure for equalization of interior-exterior air pressure differentials during storm conditions to reduce susceptibility of the structure to windstorm damage.

An object of this invention is to provide a multisection slotted roof structure in which the slot aperture size and directional orientation of some sections is reversed with respect to other sections to utilize wind and airfoil differential pressures to improve ventilating air distribution within the structure.

An object of this invention is to provide a compact low profile animal shelter building inherently less susceptible to windstorm damage.

An object of this invention is to reduce the quantity and weight of structural materials heretofore required for effective shelter to farm animals.

An object of this invention is to reduce the cubic volume of building structure required for effective shelter of farm animals.

An object of this invention is to provide an improved feedlot shelter structure for use above an improved solid floor surface such as that described in U.S. patent application, Ser. No. 385,621, of Ralph Kissinger, Jr. and entitled, SANITARY FLUSHIBLE FLOOR FOR CATTLE CONFINEMENT FEEDLOTS.

These and other features and objects of the invention will become apparent from the following description when taken in conjunction with the accompanying drawings. In the drawings:

FIG. 1 is an end elevational view of the ventilated shelter structure of this invention installed around and above a slotted floor structure arranged for subfloor flushing or scraper removal of accumulated wastes;

FIG. 2 is a cross-sectional view taken along line 2—2 of FIG. 1; and

FIG. 3 is a fragmentary, perspective view of a pair of adjacent roof panels of the shelter structure, showing a spacer for holding the panels separated to form a ventilating slot therebetween.

DETAILED DESCRIPTION OF THE PREFERRED EMBODIMENTS

Referring to FIG. 1, building 10 of the present invention comprises a shelter structure serving as a close confinement feedlot. Building 10 has a first, flushible feedlot floor of the type described in the abovementioned patent application of Ralph Kissinger, Jr., Ser. No. 385,621. Floor 11 has sloped upper surfaces which permit flowable animal wastes to gravitate into subfloor conduits 11a. Building 10 can also have other types of floors, such as a slotted floor 12 installed above subfloor pits 12a in which cable drawn scrapers (not shown) are used to mechanically remove accumulated manure wastes. This technique has been developed by Corral Industries, Inc., Phoenix, Ariz. Alternatively, subfloor oxidation recirculation ditch construction may be employed as described in the literature of Iowa Beef Processors, Ind., Dakota City, Nebr., or subfloor storage pits may be used as described in Butler Manufacturing Company, Kansas City, Mo., and by Badger Northland Incorporated, Kaukauna, Wis.

Building 10 has an improved roof whose roof line is relatively low. Building 10 also has a pair of opposed open sides 14 and 15, each of which is about 8 feet high. Typically, roof 13 extends from open sides 14 and 15 and rises at about an 8 percent slope to a ridgeline peak 16 about 15 feet above roadway ground level 17 to provide clearance for feed trucks delivering feed to feed bunks 18 and 19. Typically, the overall area covered by such feedlot shelter structures is about 110 feet wide by up to 1,125 feet long, a total of about 125,000 square feet to provide pen spaced for feeding of about 5,000 head of cattle at an average density of about 20 square feet per head. A modern feedlot capacity of 40,000 head is not unusual and such an installation would require 8 such structures.

The roofline profile defined by the dashed line 20 illustrates the relatively higher solid roof structure typically required for conventional confinement feedlot structures wellknown in the art. In such structures, the open sides denoted by numerals 21 and 22 are usually about 11 feet high to insure adequate inflow of inventilation air. The roof of such a conventional structure may rise at an increased slope to accelerate thermal heat rise airflow to a ridgeline vent discharge slot 23. Usually some sort of canopy structure 24 is required to prevent entry of rain, sleet and snow into the ridgeline vent 23. Sometimes the roof structure is extended, as illustrated at 25, to provide canopies to afford shelter protection against the elements. This is necessary due to the relatively high open sidewalls required in such solid roof shelter structures. Alternatively, removable panels may be required to partially close the windward sides 21 and 22 during periods of exposure to cold winds.

As compared to the relatively low profile structure of the present invention, the dimensions of a conventional structure of camparable utility are: sidewall structure height 25 percent higher, projected roof ridge peak about 25 percent higher plus about an additional 2 feet for vent canopy construction. Cubic volume is about 27 percent greater. Surface exposure to wind pressure is proportionately greater requiring additional strength of structural materials. The total weight of structural steel and other construction materials required is about 20 percent greater than for a structure of comparable functional utility constructed in accordance with the teachings of this invention. Thus, substantial savings in initial construction costs and in subsequent maintenance costs can be realized. FIGS. 2 and 3 show the way in which a pair of adjacent roof panels 32 are interconnected to form a ventilation slot 30 therebetween. Roof panels 32 are of sheetmetal and are typically 3 feet in width. A typical panel is one known as a Shadowline panel manufactured and sold by Soule Steel Company, San Francisco, Calif. The panels are fastened to special roof purlin structural members 33 supported on rafters 33a. The roof panels are preferably formed with longitudinal, hollow ribs 34 for stiffening purposes. The side margins of the roof panels are formed with larger ribs 35 and 35 designed for special overlapping at adjacent panels. An air space of about 1½ inches between overlapping edges of the panels is created by spaced supporting brackets 37.

Each bracket 37 is substantially V-shaped and is approximately 2 inches wide. The bracket has a pair of opposed sides 38, a pair of flanges 40 on respective sides 38, and a flat end 42 at the apex of the bracket. Flanges 40 are secured by fasteners 44 to one of panels 32 and end 42 is connected by a fastener 46 to the adjacent panel 32 as shown in FIGS. 2 and 3. Other types of projections can be used to keep adjacent panels spaced apart from each other, if desired.

The shape of ribs 35 and 36 and the fact that the ventilation slots 30 therebetween are in the direction of the slope of the roof is effective in preventing direct entry of rain, sleet and snow into the building and provides for drainage of water for discharge to perimeter roadway areas.

The 1½ inch ventilation slots spaced about 36 inches apart extend effectively over the entire roof area and provide total open vent space of about 4 square feet per 100 square feet of total roof surface area. The ventilation capability of these slots is excellent as they are uniformly distributed over the entire roof surface. The resultant airflow within the building is diffused and relatively draft-free. There are no large surface areas across which large air pressure differentials may develop with resultant draft concentration of equalizing airflow.

The width of the slots may be varied from about ½ inch to 2 inches net opening depending upon the local climatic conditions at the feedlot site with generally larger slots being used in warm weather locations.

The orientation of the slots with reference to the prevailing wind direction at the feedlot site is usually downwind. In this orientation, direct inflow of wind is reduced and the airflow over the roof panel surface creates a venturi air suction effect, increasing the rate of discharge of air from the interior.

For feedlots installed in relatively warm or humid locations, and where average wind velocity is low, the slots may be oriented to open upwind to utilize direct wind pressure to increase the airflow therethrough.

In very wide roof structures, or wherein multiple structures are installed close together, the relative ventilation effectiveness at the open sidewall area may be substantially reduced. In such situations, it is advantageous to divide the roof surface into multiple sections in which the roof slot orientation is sequentially reversed. Thus, the prevailing wind is utilized for diffused entry into the building interior at upwind slot sections and for diffused discharge at downwind slot sections. The airfoil characteristics and wind/air pressures developed upon the upwind and downwind slopes of the peaked roof profile should be taken into account in the determination of oppositely oriented roof slot areas and orientation according to engineering principles well-known to those skilled in the art.

In a conventional solid roof shelter structure, under conditions of relatively cold exterior temperature, the rising flow of humid warm air created by the large numbers of cattle within the building will result in condensation of troublesome amounts of moisture upon contact with the relatively cold interior surface of the roof panels. Costly installations of thermal insulation or of water condensate drainage is often required to protect the animals from dripping water and to avoid structural deterioration.

In the ventilated roof structure of the present invention, there is a continuous and naturally occurring exchange of interior and exterior air flowing through the slots and over the surfaces of the panels. As a result, the temperature differential between interior roof panel surfaces and interior air immediately adjacent thereto is substantially reduced and water condensation is practically eliminated.

During windstorm conditions, the rapid flow of air over the surface of conventional solid roof structures will create airfoil pressure differentials between intereior and exterior surfaces of the roof panels especially as the sidewall areas are open. During windstorm conditions, such pressure differentials may damage the structure unless additional cost is invested in stronger structural members and roof panels than would otherwise be required.

In the ventilated roof structure of the present invention, any airfoil pressure created by wind forces acting upon a roof panel surface is effectively equalized or neutralized by airflow through the slots to provide pressure relief. Thus, the slotted roof structure of this invention is inherently less susceptible to windstorm damage.

Thus, according to the teachings of our invention, a more efficient and lower cost farm aniaml confinement shelter facility is described and which provides an improved environment for the animals resident therein. A substantial savings in national resorce structural steel and other materials is also achieved.

While we have described and illustrated some specific embodiments of our invention, it will be clear that variations of the details of construction which are specifically illustrated and described may be restored to without departing from the spirit and scope of the invention as defined in the appended claims.

We claim:

1. A building for the close confinement of farm animals comprising: a roof; means supporting the roof in spaced relationship above the ground and in covering relationship to an animal-receiving area, said roof having a plurality of interconnected panels, each panel having a pair of opposed side margins overlapping the side margins of adjacent panels, each pair of adjacent panels being vertically spaced apart at said side margins to form a slot therebetween in the direction of the slope of the roof for ventilating said area to the atmosphere above the roof.

2. A building as set forth in claim 1, wherein is provided means at spaced locations between each pair of adjacent roof panels for holding the latter separated from each other to thereby form the slots therebetween.

3. A building as set forth in claim 2, wherein said holding means comprises a substantialy V-shaped member secured at the opposed ends thereof to one of the adjacent roof panels and secured at the apex thereof to the other adjacent roof panel.

4. A building as set forth in claim 1, wherein each pair of adjacent roof panels has means on the corresponding side margins for forming a serpentine path through the space therebetween.

5. A building as set forth in claim 4, wherein said forming means comprises a hollow rib at each side margin of the roof panel, the side ribs of the adjacent pair of roof panels being partially received within each other to form said path.

6. A building for the confinement of farm animals in a confined area comprising: a peaked roof having a plurality of interconnected panels; means mounting the roof above the ground and in covering relationship to a confined, animal-receiving area, each panel having a pair of opposed side margins and a hollow rib at each side margin, respectively; and means coupled with the side margins of each pair of adjacent ribs for spacing the side margins apart to form a slot therebetween for ventilation of said area to the atmosphere above the roof, the ribs of adjacent panels being partially received within each other to form a serpentine path for the flow of air through the corresponding slot.

7. A building as set forth in claim 6, wherein the slots between adjacent panels extend from the peak of the roof to the lower extremities thereof.

8. A building as set forth in claim 6, wherein said spacing means includes a plurality of spaced members secured to and spanning the distance between the proximal side margins of respective adjacent pairs of panels.

9. A building as set forth in claim 8, wherein each member is transversely V-shaped.

* * * * *